United States Patent
Chong

(10) Patent No.: US 8,337,935 B2
(45) Date of Patent: *Dec. 25, 2012

(54) PORKHIDE DOG CHEWS

(75) Inventor: Zhu Zhao Chong, Nanyan (CN)

(73) Assignee: Prestige Pet Products, Inc., Novi, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/875,682

(22) Filed: Sep. 3, 2010

(65) Prior Publication Data

US 2011/0003044 A1    Jan. 6, 2011

Related U.S. Application Data

(63) Continuation of application No. 10/106,402, filed on Mar. 26, 2002, now Pat. No. 7,790,212.

(30) Foreign Application Priority Data

Mar. 31, 2001    (CN) .................................. 01 105819

(51) Int. Cl.
*A23B 4/044*    (2006.01)
(52) U.S. Cl. ........ 426/645; 426/314; 426/465; 426/512; 426/805; 119/710; 119/711
(58) Field of Classification Search .......... 426/314–315, 426/335, 320, 641, 645, 465, 512, 520, 805; 44/589–590; 119/709–711
See application file for complete search history.

(56) References Cited

U.S. PATENT DOCUMENTS

| | | | |
|---|---|---|---|
| 1,149,170 A | 8/1915 | Allis |
| 1,337,974 A | 4/1920 | Casey |
| 1,534,867 A | 4/1925 | Peschke et al. |
| 2,013,479 A | 9/1935 | Robinson |
| 2,185,547 A | 1/1940 | Fowler |
| 2,290,854 A | 7/1942 | Hoy |
| 2,345,463 A | 3/1944 | Cox |
| 2,721,142 A | 10/1955 | Shinn et al. |
| 2,988,045 A | 6/1961 | Fisher |
| 3,106,884 A | 10/1963 | Dalve et al. |
| 3,107,651 A | 10/1963 | Beck |
| 3,123,047 A | 3/1964 | Fisher |
| 3,198,173 A | 8/1965 | Fisher |

(Continued)

FOREIGN PATENT DOCUMENTS

CA    674261    11/1963

(Continued)

OTHER PUBLICATIONS

A.D. Livingston, "Cold-Smoking & Salt-Curing Meat, Fish, & Game," Lyons & Burford, p. 43-47 & 83-112, 1995.

(Continued)

*Primary Examiner* — Drew E Becker
(74) *Attorney, Agent, or Firm* — Brooks Kushman P.C.

(57) ABSTRACT

The present invention provides a method of processing porkhide dog chews. The method includes the step of first subjecting pigskin rawhide to defatting and depilation treatment. Then the rawhide is split to obtain a first, a second, a third and a fourth layer of rawhide material. The rawhide material undergoes defatting, rinsing, and sun-drying to produce a finished hide product. The hide product is smoked to achieve objectives of dying and flavoring to result in a finished porkhide dog chew product.

18 Claims, 1 Drawing Sheet

U.S. PATENT DOCUMENTS

| | | | |
|---|---|---|---|
| 3,295,585 A | | 1/1967 | Kovach, Jr. et al. |
| 3,368,528 A | | 2/1968 | Ganoe |
| 3,441,001 A | | 4/1969 | Fisher |
| 3,454,377 A | * | 7/1969 | Renwick, Jr. ............... 44/628 |
| 3,665,988 A | | 5/1972 | Aceto et al. |
| 3,709,698 A | | 1/1973 | Davis |
| 3,709,700 A | * | 1/1973 | Ross ........................... 426/650 |
| 3,769,037 A | | 10/1973 | Sholl |
| 3,805,686 A | | 4/1974 | West |
| 4,095,957 A | | 6/1978 | Orsing |
| 4,145,447 A | | 3/1979 | Fisher et al. |
| 4,163,804 A | | 8/1979 | Meyer et al. |
| 4,260,635 A | | 4/1981 | Fisher |
| 4,344,973 A | | 8/1982 | Blake et al. |
| 4,364,925 A | | 12/1982 | Fisher |
| 4,511,583 A | | 4/1985 | Olson et al. |
| 4,535,725 A | | 8/1985 | Fisher |
| 4,690,045 A | | 9/1987 | Badger |
| 4,702,929 A | | 10/1987 | Lehn et al. |
| 4,724,756 A | | 2/1988 | Sarparanta |
| 4,779,525 A | | 10/1988 | Gaines |
| 4,810,510 A | | 3/1989 | Lever et al. |
| 4,869,163 A | | 9/1989 | Haskins |
| 4,874,396 A | * | 10/1989 | McLeod ........................ 44/589 |
| 4,880,642 A | | 11/1989 | Berends |
| 4,892,748 A | | 1/1990 | Andersen et al. |
| 4,921,720 A | | 5/1990 | Davis |
| 4,941,889 A | * | 7/1990 | Holmes ......................... 44/590 |
| 4,957,755 A | | 9/1990 | Causey |
| 5,011,679 A | | 4/1991 | Spanier et al. |
| 5,022,345 A | | 6/1991 | Bolivar et al. |
| 5,026,572 A | | 6/1991 | Neiberger |
| 5,046,514 A | | 9/1991 | Bolt |
| 5,047,231 A | | 9/1991 | Spanier et al. |
| D326,002 S | | 5/1992 | Rodriguez |
| D326,004 S | | 5/1992 | Rodriguez |
| 5,149,550 A | | 9/1992 | Mohilef |
| 5,290,584 A | | 3/1994 | Ray |
| 5,397,582 A | | 3/1995 | Underwood et al. |
| D357,770 S | | 4/1995 | Rodriguez |
| 5,427,805 A | * | 6/1995 | Crace ........................... 426/314 |
| 5,476,069 A | | 12/1995 | Axelrod |
| 5,512,312 A | | 4/1996 | Forney et al. |
| 5,603,976 A | | 2/1997 | Share et al. |
| 5,635,237 A | | 6/1997 | Greenberg et al. |
| 5,673,653 A | | 10/1997 | Sherrill |
| 5,786,382 A | | 7/1998 | Childers-Zadah |
| 5,897,893 A | | 4/1999 | Mohilef |
| 5,972,401 A | | 10/1999 | Kowalski |
| 6,000,319 A | | 12/1999 | Treiber |
| 6,014,950 A | | 1/2000 | Rogers |
| 6,033,715 A | | 3/2000 | Lynch |
| 6,042,873 A | | 3/2000 | Lawson |
| 6,060,100 A | | 5/2000 | Koller |
| 6,142,066 A | | 11/2000 | Anders et al. |
| 6,165,474 A | | 12/2000 | Frudakis et al. |
| 6,223,693 B1 | | 5/2001 | Perlberg et al. |
| 6,277,420 B1 | | 8/2001 | Andersen et al. |
| 6,425,348 B1 | | 7/2002 | Twain |
| 6,444,243 B1 | | 9/2002 | Duensing et al. |
| 6,455,083 B1 | | 9/2002 | Wang |
| 6,584,938 B2 | | 7/2003 | Sherrill et al. |
| 6,601,539 B1 | | 8/2003 | Snook |
| 6,705,213 B1 | | 3/2004 | Thomas |
| 6,827,041 B2 | | 12/2004 | Hague et al. |
| 6,886,497 B1 | | 5/2005 | Hague |
| 7,790,212 B2 | | 9/2010 | Chong |
| 2003/0138526 A1 | | 7/2003 | Hague |
| 2003/0138528 A1 | | 7/2003 | Hague |

FOREIGN PATENT DOCUMENTS

| | | |
|---|---|---|
| CN | 1063795 | 8/1992 |
| CN | ZL01311403.4 | 11/2001 |
| CN | ZL01311404.2 | 11/2001 |
| CN | ZL01311405.0 | 11/2001 |
| CN | ZL01238624.3 | 2/2002 |
| JP | 03292873 A | 12/1991 |
| JP | 5192095 | 8/1993 |
| JP | 10295331 A | 11/1998 |
| WO | 8911799 A2 | 12/1989 |

OTHER PUBLICATIONS

Q/NHH Jan. 2001, "Dog Chewing bones," Feb. 16, 2001, 7 pgs.

Pork Treats, Doctors Foster & Smith, 1999, cover and p. 135, vol. 99-32.

Hickory Smoked Rawhide, Gimborn U.S., Date Unknown—Document not self-authenticating; Published in 1992 according to Notice of References Cited from U.S. Appl. No. 10/106,402, mailed Jan. 18, 2008.

* cited by examiner

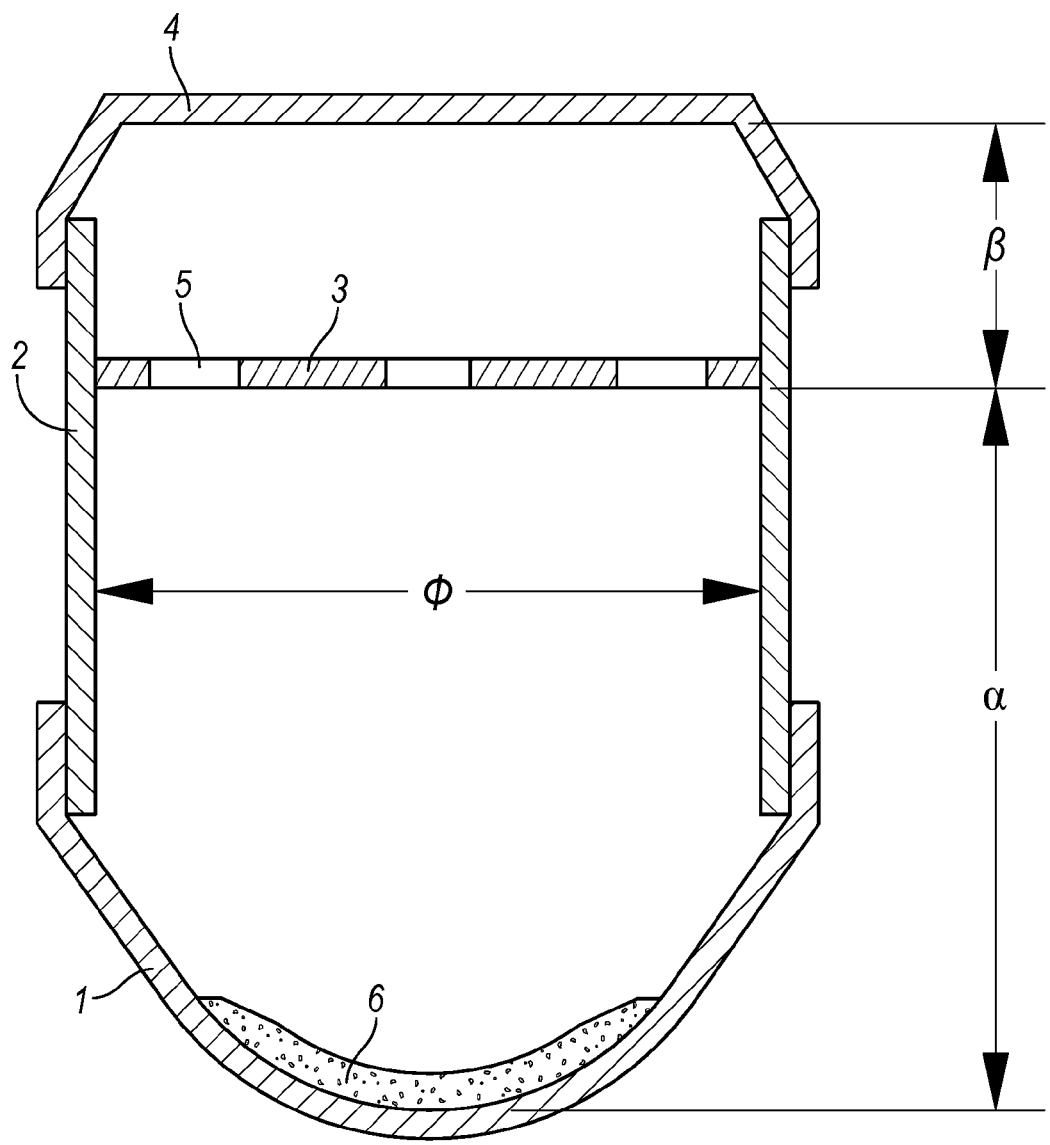

PORKHIDE DOG CHEWS

CROSS-REFERENCE TO RELATED APPLICATIONS

This application is a continuation of U.S. application Ser. No. 10/106,402 filed Mar. 26, 2002, now U.S. Pat. No. 7,790,212, which, in turn, claims foreign priority to State Intellectual Property Office of the People's Republic of China Application No. 01105819.6, filed Mar. 31, 2001 and published Apr. 2, 2001, which subsequently issued on May 19, 2004, Patent Certificate No. 155117; the disclosures of which are incorporated in their entirety by reference herein.

BACKGROUND OF THE INVENTION

1. Field of the Invention

The present invention relates to methods of processing pet food products made from animal hide.

2. Background Art

Pet chewing bones made from animal hide are a type of pet food product, called dog chews in the industry. There is enormous market demand for these products in advanced countries such as Japan, the United States, the United Kingdom, and Australia. Annual sales volumes may reach billions of US dollars. These products are primarily produced in Brazil, Thailand, and China and are exported to countries where there is demand. The dog chew manufacturers in China are primarily located around Shuitou Town, Pingyang County, Wenzhou. The reason for this is that Shuitou Town has the largest pig and cattle tannery centers in China and thus provides a sure supply of raw materials for dog chew production.

In the process of making dog chews, raw hide undergoes defatting and depilation treatment. It is then split into first, second, third, and fourth layers of rawhide material, which then undergo further defatting, rinsing, and sun-drying to become finished hide products. The finished hide product is then cut, soaked, plaited and shaped, dried, dyed, and flavored, and the result is animal hide dog chews. If the finished-product hide is shredded, mixed with adhesive, mould-pressed and formed, dried, dyed, and flavored, the result is an adhesive product dog chew. That is, dog chews can be classed either as animal hide dog chews or as adhesive product dog chews, depending on the processing steps. In addition, dog chews can also be classed according to the raw material as either cowhide dog chews or porkhide dog chews.

The fact that cowhide has small pores and less grease means that cowhide dog chews boast smooth and lustrous surfaces that can easily be dyed different colors and soaked to take on many delicious flavors. The aforementioned process of dyeing and flavoring consists of directly using food dyes and flavor essences on the surface of the finished product. This method is very well suited to cowhide dog chews. Because pork hides have large pores and high fat content, porkhide dog chews appear rough, plain, dull, and white. They smell of rawhide and uncooked oil. Moreover, there is no way to dye or flavor them, for their oily surface can hardly absorb any dyes or flavor essences. Therefore, although the raw material for porkhide dog chews enjoys a huge advantage in terms of availability and ease of purchase (relative to cowhide), it is difficult to change the unappealing color and odor of porkhide dog chews using the current, general dyeing and flavoring methods. As a result, cowhide dog chews have won most of the dog chew market, and porkhide dog chews have just a minor share of the market.

A goal of the present invention is to provide a porkhide dog chew processing method that can thoroughly change the original color and odor of porkhide dog chews.

SUMMARY OF THE INVENTION

In order to achieve the above-described objective, the technical solution of the present invention is thus: To use a smoking process on semi-finished porkhide chew products, i.e. shaped hide products or shaped adhesive products, to achieve the objectives of flavoring and dyeing.

The above-described technical solution can be: a method of processing porkhide dog chews, the primary processing procedures of which comprise subjecting rawhide to defatting and depilation treatment, then splitting the hide to obtain first, second, third, and fourth-layer rawhide materials, then defatting, rinsing, and sun-drying same to make a finished hide product, then cutting, soaking, pleating, shaping, and drying the finished hide product to form a shaped animal hide product, and then smoking the shaped animal hide product to achieve the objectives of dyeing and flavoring and thus to obtain finished porkhide dog chew products.

The above-described technical solution can also be: a method of processing porkhide dog chews, the primary processing procedures of which comprise subjecting rawhide to defatting and depilation treatment, then splitting the hide to obtain first, second, third, and fourth-layer rawhide materials, then defatting, rinsing, and sun-drying it to make a finished hide product, then shredding, mixing with adhesive, mould-pressing and forming, and drying the finished hide product to form a shaped adhesive product, and then smoking the shaped adhesive product to achieve the objectives of dyeing and flavoring and thus to obtain finished porkhide dog chew products.

BRIEF DESCRIPTION OF THE DRAWING

The present invention is described in greater detail below in the light of the embodiments and attached drawings:

FIG. 1 is a structural drawing of the smoking equipment provided by the present invention.

DETAILED DESCRIPTION OF THE PREFERRED EMBODIMENT

Hide material for shaped porkhide products has large pores, which are easily penetrated by smoke. It absorbs heat and absorbs smoke more readily than other hides such as cowhide. When combined with smoke the resulting odors are very pleasant. At the same time, the surface of shaped porkhide products is greasy. In situations where the general direct dyeing and flavoring methods prove ineffective, the surface grease is heated and melted, enabling the smoke to act on the shaped product while it is greasy so as to give it a bright luster while dyeing it.

Cowhide dog chews are suited to direct dyeing and flavoring because their hide materials have small pores and small amounts of grease, and for many years, the industry had a fixed way of thinking, or conceptual inertia: whenever one thought of changing the smell or color of a dog chew, one would think of directly dyeing and flavoring, i.e. of relying on the direct action of food dyes and flavor essences on finished product surfaces. Consequently, although porkhide dog chews enjoy a huge advantage in terms of raw materials and costs (especially in Shuitou Town, Wenzhou, Zhejiang, China), the fact that direct dyeing and flavoring are unable to improve its unappealing color and smell has meant that, for many years, porkhide dog chews have had a tiny market share.

The smoking process put forth by the present invention is simple and ingenious and effectively solves a difficulty involved in porkhide dog chew processing. It is as if a thin layer of paper were laid between the natural characteristics of porkhide and the unique effects of the smoking process. After the inventor poked an opening with one finger, success was quickly attained on both sides. Therefore, the present invention will play a critical role in the successful acceptance of porkhide dog chews in the marketplace. In addition to having dyeing and flavoring effects, the smoking process provided by the present invention thoroughly solves a problem that formerly plagued this product, i.e. the fact that, being very greasy, it could not easily be processed and was vulnerable to mildewing and thus had difficulty meeting standards during border-crossing inspections.

In order to change the original unappealing color and smell of the porkhide dog chew, the shaped animal hide product or shaped adhesive product is placed on a box rack 3 in the smoking equipment. The smoking equipment, as shown in FIG. 1, comprises a smoke generator 1, a smoke box 2, the box rack 3, and a box cover 4. Smoke fuel 6 is placed in the smoke generator 1. The smoke generator 1 is heated such that the smoke fuel 6 produces smoke due to heating and oxygen-deficient carbonization. The hot smoke rises and passes through airflow holes 5 to the box cover 4 and subsequently falls slowly to the box rack 3, where it comes into contact and combines with the shaped product on the box rack 3, thereby achieving the objective of changing the color and smell of the porkhide dog chew. During the process of hot smoke rising and then falling, the temperature of the hot smoke gradually drops. As a result of the gap between the smoke generator 1 and the box rack 3 and between the rack 3 and the box cover 4, the temperature of the smoke rises and falls such that, while it is combining with the shaped product it will not be too high as to burn the product.

While the shaped porkhide dog chew product is being smoked, it must not be subjected to temperatures that are either too high or too low. Otherwise, it may very well burn, or the smoking may be ineffective due to insufficient heat. Therefore, the inventor deduced through several trials that the ideal dimensions for the smoke box include an internal diameter between 50 cm and 120 cm, and a height from the smoke generator to the box rack greater than 20 cm. These dimensions cause the smoke to rise at least 20 cm before reaching the smoked object for the first time, thereby preventing excessively high smoke temperatures and preventing burning of the smoked object. The result of a height from the box rack to the box cover of less than 25 cm provides that, after the smoke touches the top, the length of its descent is not much further. Thus, after the smoke falls back, the temperature will not be too low when the smoke touches the smoked object. This ensures the proper smoking effect. During the smoking process, the smoked object undergoes a full contact reaction with the smoke only after the smoke has risen and fallen back to the height where the smoked object lies. In FIG. 1, the internal diameter of the smoke box f, the height from the smoke generator to the box rack a, and the height from the box rack to the box cover b are 78 cm, 30 cm, and 15 cm respectively. Therefore, the resulting smoking equipment can more effectively perform its smoking function.

The smoke fuel used in the smoking process primarily consists of a type of starch smoke fuel such as shredded sweet potato or bran coat or husked rice and a sugar smoke fuel such as dark brown sugar or raw sugar or light brown sugar or locally-produced rock sugar. Moreover, when the weight of the starch smoke fuel is from fifty-five to sixty-five percent of the total weight of the smoke fuel, and when the weight of the sugar smoke fuel is from forty-five percent to thirty-five percent of the total smoke fuel weight, the results of the smoking processing are quite good. The starch, sugar, and other main ingredients in the smoking process carbonize due to excessive heat and lack of oxygen, producing a fragrant, sweet smoke of cooked sugar and starch. The rather high temperatures in the box also cause the surface layer of the shaped products to undergo partial cooking The molecules of the surface layer move violently and combine very well with the smoke containing sugar and starch ingredients, thereby changing the color, smell, and taste of the shaped product and causing it to have a golden color and an appealing smell that is fragrant with a hint of sweetness. The inventor has found as a result of a long period of experimentation that quite satisfactory results are obtained from using a smoke fuel composed of shredded sweet potato and dark brown sugar, wherein the shredded sweet potato is sixty percent of total weight and dark brown sugar is forty percent of total weight.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A porkhide dog chew comprising:
   a dried, shaped, depilated, porkhide product formed from a single porkhide layer having a surface portion; and
   a gaseous smoke residue absorbed into the surface portion of the dried, shaped, depilated, single layer porkhide product, the smoke residue comprises a starch or sugar smoke fuel component.

2. The porkhide dog chew of claim 1 wherein the dried porkhide product defines a number of pores; and wherein the smoke residue is absorbed into the pores of the dried porkhide product.

3. The porkhide dog chew of claim 1 wherein the porkhide product is a dried defatted porkhide product.

4. The porkhide dog chew of claim 1 wherein the porkhide product is a dried shredded porkhide product.

5. The porkhide dog chew of claim 1 wherein the porkhide product is a dried pressure-molded porkhide product.

6. The porkhide dog chew of claim 1 wherein the starch smoke fuel component comprises a shredded sweet potato component.

7. The porkhide dog chew of claim 1 wherein the sugar smoke fuel component comprises a dark brown sugar component.

8. The porkhide dog chew of claim 1, wherein the dried, shaped, depilated porkhide product is a dried, shaped, pleated, depilated porkhide product.

9. The porkhide dog chew of claim 1, wherein the dried, shaped, depilated porkhide product is a dried, plaited, shaped, depilated porkhide product.

10. A porkhide dog chew comprising:
    a dried, shaped, depilated porkhide product formed from a single porkhide layer defines a number of pores; and
    a gaseous smoke residue absorbed into the pores of the dried porkhide product, the smoke residue comprises a starch or sugar smoke fuel component.

11. The porkhide dog chew of claim 10 wherein the porkhide product is a dried defatted porkhide product.

12. The porkhide dog chew of claim 10 wherein the porkhide product is a dried shredded porkhide product.

13. The porkhide dog chew of claim 10 wherein the porkhide product is a dried pressure-molded porkhide product.

14. The porkhide dog chew of claim 10, wherein the dried, shaped, depilated porkhide product is a dried, shaped, pleated, depilated porkhide product.

15. The porkhide dog chew of claim 10, wherein the dried, shaped, depilated porkhide product is a dried, plaited, shaped, depilated porkhide product.

16. A porkhide dog chew comprising:
a dried shaped depilated porkhide product formed from a single porkhide layer having a surface portion defining a number of pores; and
a gaseous smoke residue absorbed into the pores of the surface portion of the dried porkhide product, the smoke residue comprises a starch or sugar smoke fuel component.

17. The porkhide dog chew of claim 16, wherein the dried, shaped, depilated porkhide product is a dried, shaped, pleated, depilated porkhide product.

18. The porkhide dog chew of claim 16, wherein the dried, shaped, depilated porkhide product is a dried, plaited, shaped, depilated porkhide product.

\* \* \* \* \*